United States Patent
Harvey

(10) Patent No.: US 9,830,220 B1
(45) Date of Patent: Nov. 28, 2017

(54) ENHANCED ERROR RECOVERY FOR DATA STORAGE DRIVES

(71) Applicant: EMC Corporation, Hopkinton, MA (US)

(72) Inventor: David W. Harvey, Newton, MA (US)

(73) Assignee: EMC IP Holding Company LLC, Hopkinton, MA (US)

(\*) Notice: Subject to any disclaimer, the term of this patent is extended or adjusted under 35 U.S.C. 154(b) by 160 days.

(21) Appl. No.: 14/500,471

(22) Filed: Sep. 29, 2014

(51) Int. Cl.
*G06F 11/10* (2006.01)
*G06F 3/06* (2006.01)
*G06F 11/20* (2006.01)

(52) U.S. Cl.
CPC ........ *G06F 11/1076* (2013.01); *G06F 3/0619* (2013.01); *G06F 3/0647* (2013.01); *G06F 3/0689* (2013.01); *G06F 11/1008* (2013.01); *G06F 11/108* (2013.01); *G06F 11/1088* (2013.01); *G06F 11/2094* (2013.01); *G06F 2211/1057* (2013.01); *G06F 2211/1059* (2013.01); *G06F 2211/1061* (2013.01); *G06F 2211/1064* (2013.01); *G06F 2212/262* (2013.01)

(58) Field of Classification Search
CPC ........ G06F 11/1076; G06F 11/108; G06F 11/1088; G06F 11/1008; G06F 11/2094; G06F 3/0619; G06F 3/0647; G06F 3/0689; G06F 2211/1057; G06F 2211/1059; G06F 2211/1061; G06F 2211/1064; G06F 2212/262

USPC .... 714/E11.034, 6.24, 6.12, 6.21, 6.32, 770, 714/E11.085, E11.142, 15, 20, 48, 52, 714/6.2, 801, 819; 711/114, 154, 111

See application file for complete search history.

(56) References Cited

U.S. PATENT DOCUMENTS

| | | | | |
|---|---|---|---|---|
| 5,504,858 A * | 4/1996 | Ellis | ................... | G06F 11/1076 714/52 |
| 5,522,032 A * | 5/1996 | Franaszek | ........... | G06F 11/1076 711/E12.019 |
| 5,745,671 A * | 4/1998 | Hodges | ............... | G06F 11/1076 711/114 |
| 5,748,885 A * | 5/1998 | Gallagher | ........... | G06F 11/1076 714/48 |
| 6,480,970 B1 * | 11/2002 | DeKoning | .......... | G06F 11/2069 714/5.11 |
| 6,675,318 B1 * | 1/2004 | Lee | ..................... | G06F 11/1076 714/6.21 |
| 6,799,283 B1 * | 9/2004 | Tamai | ................. | G06F 11/1076 714/6.12 |
| 7,337,287 B2 * | 2/2008 | Morimoto | ........... | G06F 11/1076 711/114 |
| 8,037,244 B2 * | 10/2011 | Muto | ................... | G06F 11/1076 711/112 |
| 8,209,587 B1 * | 6/2012 | Taylor | ................. | G06F 11/1088 711/114 |
| 8,239,706 B1 * | 8/2012 | Yang | .................. | G06F 11/1076 714/15 |

(Continued)

*Primary Examiner* — John J Tabone, Jr.
(74) *Attorney, Agent, or Firm* — BainwoodHuang

(57) ABSTRACT

Methods and systems for enhanced error recovery are described. A first one or more data blocks to write to a first drive are received by a first drive controller module. A first parity block is calculated by the first drive controller module based on a first data block parity group. The first one or more data blocks are written by the first drive controller module to the first drive. The first parity block is written by the first drive controller module to the first drive.

12 Claims, 7 Drawing Sheets

(56) References Cited

U.S. PATENT DOCUMENTS

| | | | |
|---|---|---|---|
| 8,527,698 B2* | 9/2013 | Bert | G06F 11/1076 |
| | | | 710/39 |
| 8,862,818 B1* | 10/2014 | Ozdemir | G06F 3/0689 |
| | | | 711/114 |
| 8,898,381 B2* | 11/2014 | Leach | G06F 11/1008 |
| | | | 711/100 |
| 2002/0161972 A1* | 10/2002 | Talagala | G06F 11/1076 |
| | | | 711/114 |
| 2002/0178325 A1* | 11/2002 | Allingham | G06F 11/1076 |
| | | | 711/111 |
| 2003/0120674 A1* | 6/2003 | Morita | G06F 3/0611 |
| 2003/0188097 A1* | 10/2003 | Holland | G06F 11/1076 |
| | | | 711/114 |
| 2005/0283654 A1* | 12/2005 | Wood | G06F 11/1092 |
| | | | 714/6.32 |
| 2006/0080505 A1* | 4/2006 | Arai | G06F 11/1076 |
| | | | 711/114 |
| 2006/0101202 A1* | 5/2006 | Mannen | G06F 11/1076 |
| | | | 711/114 |
| 2007/0028045 A1* | 2/2007 | Hung | G06F 3/0613 |
| | | | 711/114 |
| 2009/0259882 A1* | 10/2009 | Shellhamer | G06F 11/1076 |
| | | | 714/6.32 |
| 2013/0067273 A1* | 3/2013 | Fiske | G06F 11/1048 |
| | | | 714/6.12 |
| 2016/0018995 A1* | 1/2016 | Vadalamani | G06F 3/0619 |
| | | | 711/123 |
| 2016/0034186 A1* | 2/2016 | Weiner | G06F 3/061 |
| | | | 710/74 |

* cited by examiner

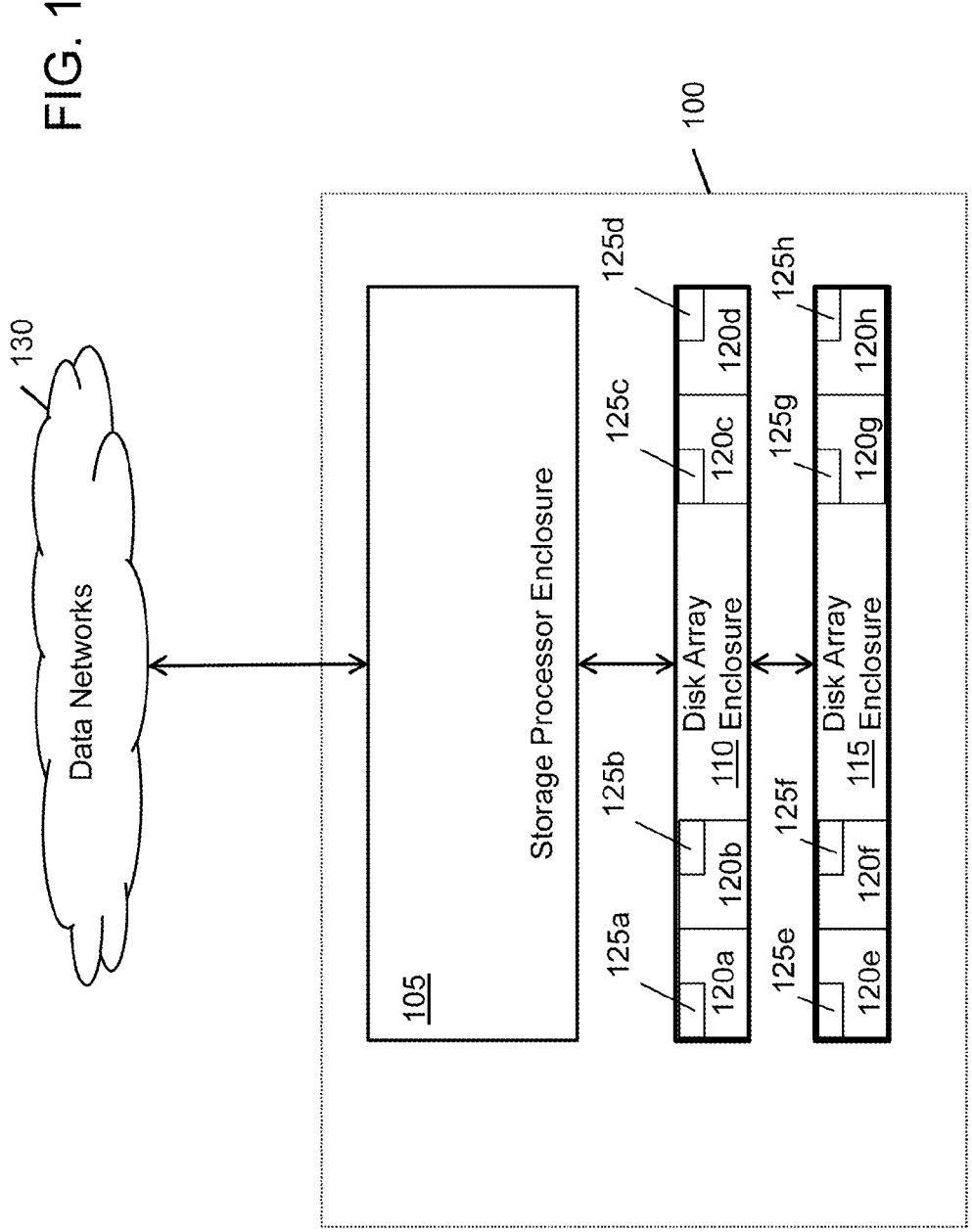

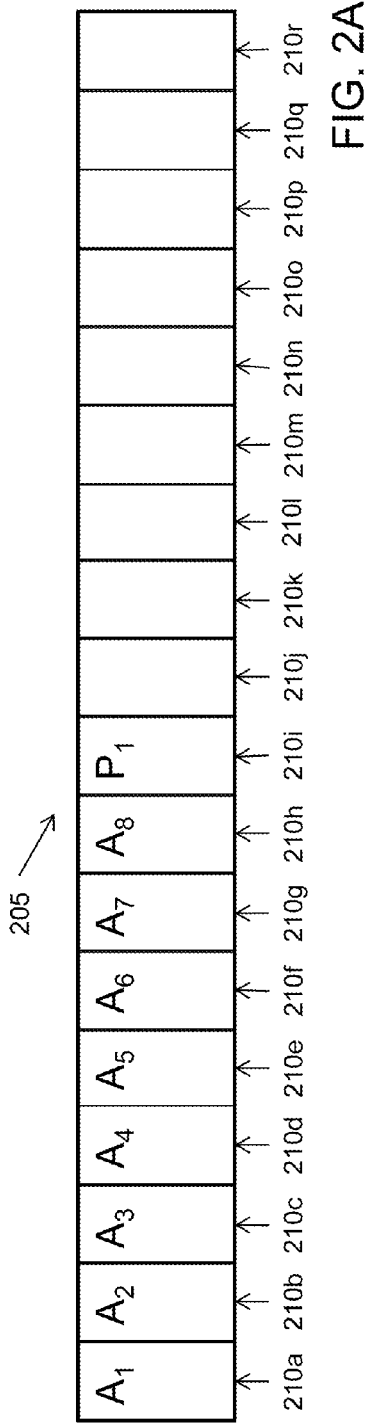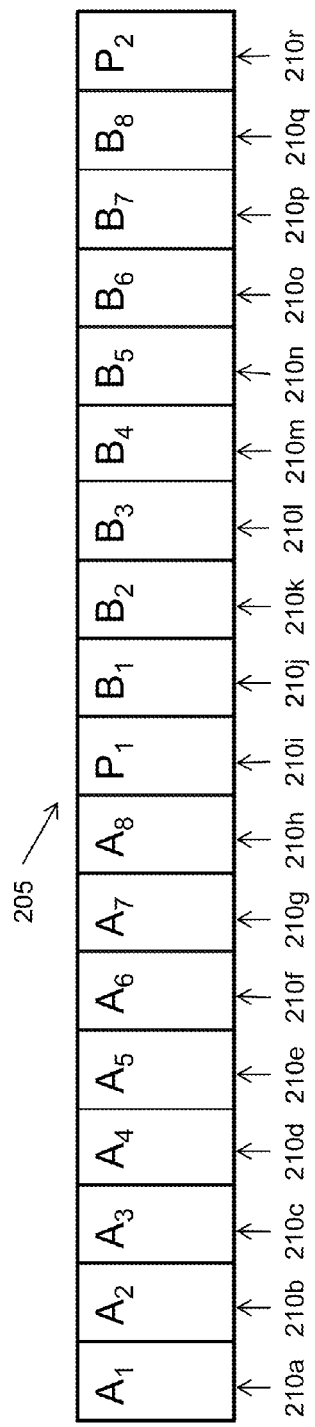

ENHANCED ERROR RECOVERY FOR DATA STORAGE DRIVES

FIELD OF THE TECHNOLOGY

The present technology relates generally to data storage drives and, more specifically, to enhanced error recovery capabilities of data storage drives.

BACKGROUND

Conventional data storage drives (e.g., hard drives) can fail in a variety ways, potentially causing data loss. For example, a drive can fail in its entirety so that no data can be read from the drive. As another example, a sector on a drive can become unreadable such that data cannot be read correctly from that specific sector. As still another example, multiple contiguous or non-contiguous sectors on a drive can become unreadable. Some techniques have been used to facilitate recovery of data in the event of a drive failure. For example, data storage drives can include an Error Correcting Code ("ECC") for each drive sector to facilitate recovery of data from that sector when there is an error. However, for sector errors where the entire sector is unreadable (e.g., the sector data and ECC are not readable), the ECC cannot be used to recover the data from the sector.

Another technique is to place drives in a RAID configuration. For example, if one of the drives in a RAID 1, 3, 4, or 5 array fails in its entirety, the data from the failed drive can be recovered using the data on the remaining drives in the array. However, recovering the data on the failed drive can require that each sector on the remaining drives in the array can be read. Therefore, when a drive in the RAID array fails and there are one or more unrecoverable sectors on the remaining drives (e.g., the sector data cannot be recovered using the ECC), the data from the failed drive can be unrecoverable.

SUMMARY OF THE TECHNOLOGY

Accordingly, there is a need for methods and systems to improve recoverability of data after drive failures and/or single or multiple sector failures. Some embodiments of the technology described herein can improve recoverability of data after drive and/or single or multiple sector failures without requiring additional drives.

In one aspect, there is a method performed by one or more drive controller modules. The method can include receiving, by a first drive controller module, a first one or more data blocks to write to a first drive. The method can include calculating, by the first drive controller module, a first parity block based on a first data block parity group, wherein the first data block parity group comprises the first one or more data blocks. The method can include writing, by the first drive controller module, to the first drive, the first one or more data blocks. The method can include writing, by the first drive controller module, to the first drive, the first parity block.

In some embodiments, the method can include receiving, by a second drive controller module, the first one or more data blocks to write to a second drive. The method can include calculating, by the second drive controller module, a second parity block based on a second data block parity group, wherein the second data block parity group comprises the first one or more data blocks. The method can include writing, by the second drive controller module, to the second drive, the first one or more data blocks. The method can include writing, by the second drive controller module, to the second drive, the second parity block.

In some embodiments, the first data block parity group consists of the first one or more data blocks. In some embodiments, the first data block parity group comprises a second one or more data blocks read from the first drive. In some embodiments, the first data block parity group comprises a pre-determined number of data blocks. In some embodiments, the method can include determining, by the first drive controller module, a number of data blocks in the first data block parity group based on a number of data blocks in the first one or more data blocks. The method can include writing, by the first drive controller module, to the first drive, the number of data blocks in the first data block parity group. In some embodiments, the method can include calculating, by the first drive controller module, the first parity block based on the first data block parity group by performing an exclusive OR operation on the first data block parity group.

In another aspect, there is a storage system. The storage system can include a first drive. The storage system can include a first drive controller module configured to: receive a first one or more data blocks to write to the first drive; calculate a first parity block based on a first data block parity group, wherein the first data block parity group comprises the first one or more data blocks; write, to the first drive, the first one or more data blocks; and write, to the first drive, the first parity block.

In some embodiments, the storage system can include a second drive. In some embodiments, the storage system can include a second drive controller module configured to: receive the first one or more data blocks to write to the second drive; calculate a second parity block based on a second data block parity group, wherein the second data block parity group comprises the first one or more data blocks; write, to the second drive, the first one or more data blocks; and write, to the second drive, the second parity block.

In some embodiments, the first data block parity group consists of the first one or more data blocks. In some embodiments, the first data block parity group comprises a second one or more data blocks read from the first drive. In some embodiments, the first data block parity group comprises a pre-determined number of data blocks. In some embodiments, the first drive controller module is further configured to: determine a number of data blocks in the first data block parity group based on a number of data blocks in the first one or more data blocks; and write, to the first drive, the number of data blocks in the first data block parity group. In some embodiments, the first drive controller module is further configured to: calculate the first parity block based on the first data block parity group by performing an exclusive OR operation on the first data block parity group.

In another aspect, there is a storage system. The storage system can include one or more drive controller modules. The storage system can include a plurality of drives in a RAID configuration. Each drive of the plurality of drives is associated with an associated drive controller module can be configured to: receive a first plurality of data blocks to write to the drive; calculate a first parity block based on a first data block parity group, wherein the first data block parity group comprises the first plurality of data blocks; write, to the drive, the first plurality of data blocks; and write, to the drive, the first parity block.

In some embodiments, the RAID configuration is selected from the group consisting of RAID 0, RAID 1, RAID 2, RAID 3, RAID 4, RAID 5, and RAID 6 configurations. In some embodiments, the first data block parity group consists of the first plurality of data blocks. In some embodiments, the first data block parity group comprises a second plurality of data blocks read from the drive. In some embodiments, the associated drive controller module is further configured to: calculate the first parity block based on the first data block parity group by performing an exclusive OR operation on the first data block parity group.

In another aspect, there is a method performed by a first drive controller module. The method can include determining, by the first drive controller module, that a first data block on a first drive is unreadable, wherein the data block is a member of a first data block parity group. The method can include reading, by the first drive controller module, from the first drive, a second one or more data blocks, wherein the second one or more data blocks are members of the first data block parity group. The method can include reading, by the first drive controller module, from the first drive, a first parity block associated with the first data block parity group. The method can include calculating, by the first drive controller module, a value of the first data block based on the second one or more data blocks and the first parity block.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 1 depicts a storage system, in accordance with the technology.

FIGS. 2A-2C illustrate data written to a drive in accordance with the technology.

DETAILED DESCRIPTION

Figure 2C:
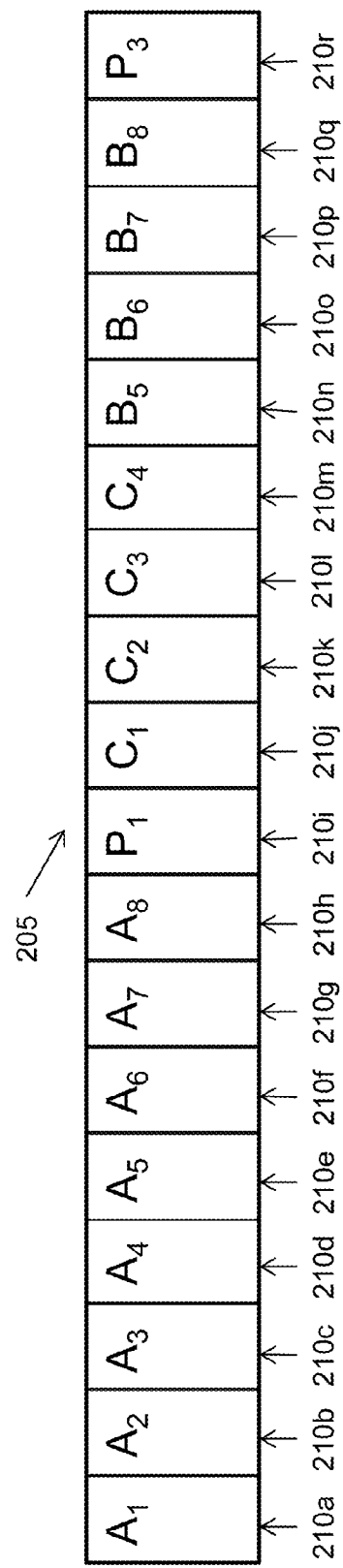

The technology described herein relates to enhanced error recovery capabilities of data storage drives. The technology can, for example, facilitate recovering data after single or multiple sector failures and/or a drive failure. In an exemplary application, the technology can be used to improve error recovery for drives in a mirrored pair configuration. In such a configuration, data written to the first drive of the mirrored pair is also written to the second drive of the mirrored pair. In accordance with aspects of the technology, when a series of data blocks are written to a drive in the mirrored pair, a parity block is also written to the drive. A data block can be any size. For example, a data block can correspond to a magnetic disk drive's sector (e.g., 512 bytes or 4 kilobytes). As another example, a data block can be another pre-determined size (e.g., multiple sectors of data). The parity block can be calculated based on the series of data blocks being written to the drive. The parity block can also be calculated based on data blocks already stored on the drive. If one of the data blocks on a drive in the mirrored pair becomes unreadable, the data block can be recovered using the parity block associated with the unreadable data block and the other data blocks that were used to calculate the parity block. Beneficially, the technology can improve error recovery in the mirrored pair of drives. For example, if one of the mirrored drives fails entirely, the remaining functional drive can still recover from losses of individual data blocks (e.g., due to one or more sector failures) by using the parity blocks stored on the remaining functioning drive.

Exemplary Storage System Environment

FIG. 1 depicts storage system 100, in accordance with the technology. Storage system 100 includes storage processor enclosure 105. Storage processor enclosure 105 can include one or more storage processors (not shown). The storage processors can be any computing devices, such as servers, blade servers, etc. Storage system 100 includes disk array enclosure 110 and disk array enclosure 115. Disk array enclosures 110 and 115 include drives 120a-120h. Drives 120a-120h can be any type of storage devices, such as magnetic disk drives, flash memory drives, solid state drives, etc. Drives 120a-120h include drive controller modules 125a-125h. In the illustrated embodiment, storage processor enclosure 105 is connected to disk array enclosure 110, which is connected to disk array enclosure 115. In illustrated storage system 100, the storage processors can read data from and write data to drives 120a-120h. Drive controller modules 125a-125h can control how data is written to and read from drives 120a-120h. Storage system 100 can be connected to data networks 130. The illustrated connections can each be any type of connection for communicating data.

In general, the storage processors in storage processor enclosure 105 service IO requests (e.g., commands to read data from or write data to storage system 100) received from data networks 130. It should be appreciated that storage system 100 in FIG. 1 is an exemplary storage system in accordance with the technology. Other configurations are contemplated. For example, in some embodiments, the storage processors and disk enclosures can be in the same enclosure. In some embodiments, more or fewer disk array enclosures can be connected to the storage processors in the storage processor enclosure. In some embodiments, the drive controller modules can be hardware. In some embodiments, the drive controller modules can be software (e.g., software executing on the service processors) or firmware. Each drive controller module can control a single drive or multiple drives.

Data Block Storage and Parity Block Calculation

FIGS. 2A-2C illustrate data written to drive 205 in accordance with the technology. For example, drive 205 can be any of drives 120a-120h shown in FIG. 1. Drive 205 can store data blocks at addresses 210a-210r. As noted above, a data block can be any size.

With reference to FIG. 2A, drive 205 is illustrated with data blocks $A_1$-$A_8$ stored at addresses 210a-210h. In accordance with the technology, parity block $P_1$ can be stored on drive 205 at address 210i. Parity block $P_1$ can be calculated based on data blocks $A_1$-$A_8$ by, for example, a drive controller module associated with drive 205. In some embodiments, the data blocks (e.g., data blocks $A_1$-$A_8$) used when calculating the parity block can be referred to as the data block parity group. Parity block $P_1$ can be calculated by performing an exclusive OR operation on data blocks $A_1$-$A_8$. For example, the nth bit of parity block $P_1$ can be calculated by performing an exclusive OR operation on the nth bits from each of data blocks $A_1$-$A_8$. Other methods of error correction are contemplated. For example, error correcting codes can be calculated across data blocks $A_1$-$A_8$ and stored in place of parity block $P_1$.

The drive controller module can receive additional data blocks for writing to drive 205. Referring to FIG. 2B, drive 205 is illustrated with data blocks $A_1$-$A_8$ stored at addresses 210a-210h and data blocks $B_1$-$B_8$ stored at addresses 210j-210q. In accordance with the technology, parity block $P_2$ can be written to drive 205 at address 210r. Parity block $P_2$ can be calculated, for example, by the drive controller module associated with drive 205 based on the data block parity group containing data blocks $B_1$-$B_8$. With reference to FIG. 2C, drive 205 is illustrated with data blocks $A_1$-$A_8$ stored at addresses 210a-210h, data blocks $C_1$-$C_4$ stored at addressed 210j-210m, and data blocks $B_5$-$B_8$ stored at addresses 210n-210q. As illustrated, data blocks $C_1$-$C_4$ are written over data blocks $B_1$-$B_4$ of FIG. 2B. In accordance with the technology, parity block $P_3$ can be written to drive 205 at address 210r. Parity block $P_3$ can be calculated, for example, by the drive controller module associated with drive 205 based on the data block parity group containing data blocks $C_1$-$C_4$ and $B_5$-$B_8$. In some embodiments, conventional techniques of providing atomicity can be used to ensure that all data blocks and the parity block are successfully written to the drive.

As illustrated above, in some embodiments, the data block parity groups can be a fixed size. In some embodiments, the data block parity group can be based on the data being stored. For example, a parity block can be written every, e.g., 4 or 8 blocks if the data is being written a few blocks at a time. If long sequential writes are common, a parity block can be written every, e.g., 100 or 200 blocks. In some embodiments, the data block parity group can be variable sized. In some embodiments, a header can be written to the drive to indicate the data blocks included in the data block parity group for a particular parity block. In some embodiments, the header can be written to another drive and/or stored in other memory on a storage system.

In some embodiments, the data blocks forming the data block parity group and the parity block are not stored consecutively and/or adjacently on the drive. For example, in some embodiments, there can be a logical mapping of the data block parity group to physical addresses on the drive. A particular data block can be mapped to one or more sectors on the drive and, in the case of multiple sectors, the sectors can be non-consecutive. Accordingly, data of the data block parity group can be distributed on the drive. Similarly, the parity block can be mapped to one or more sectors on the drive, and the sectors can be non-consecutive.

Error Recovery

The technology can facilitate data recovery after drive errors and/or failures. While magnetic disk drives can include ECC data to facilitate recovery from partial loss of a sector, in some cases the ECC data cannot be used to recover data when the entire sector is lost. The technology can facilitate recovering the data for a data block (e.g., the data for one or more failed sectors). The data stored on the failed sector can be recovered by performing an exclusive OR operation on the parity block and the remaining data blocks in the data block parity group. For example, with reference to FIG. 2C, one or more sector failures can cause data block $A_1$ stored at address 210a to be unreadable. The value of data block $A_1$ can be recovered by performing an Exclusive OR operation on the data blocks $A_2$-$A_8$ and parity block $P_1$. For example, the nth bit of data block $A_1$ can be calculated by performing an exclusive OR operation on the nth bits from each of data blocks $A_2$-$A_8$ and parity block $P_1$. Beneficially, when the data block size is larger than the drive's sector size, the technology can facilitate recovery when multiple adjacent sectors fail.

Applications

Figure 3:
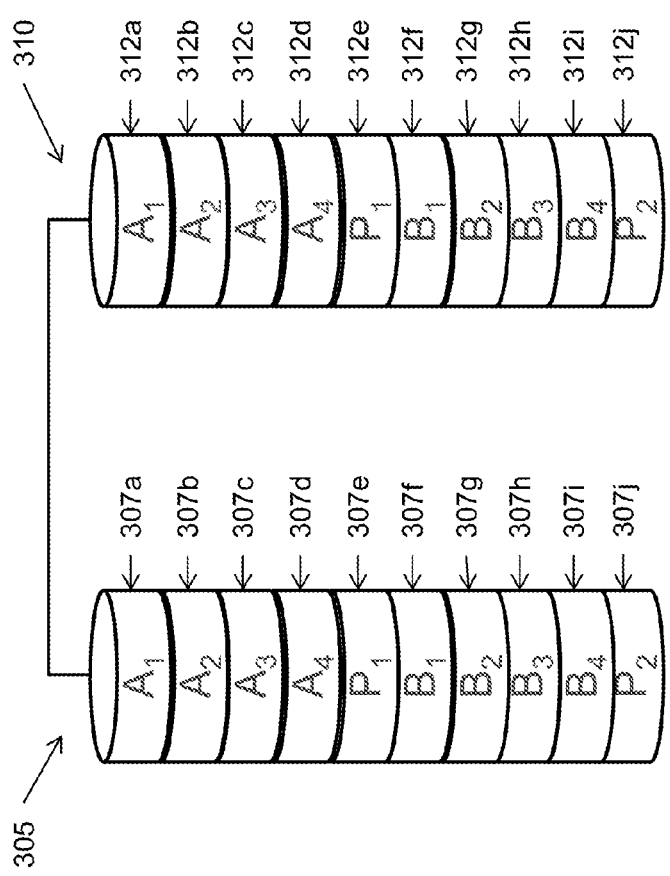
FIG. 3 depicts drives, in accordance with the technology.

The technology can be used in various drive configurations. FIG. 3 depicts drive 305 and drive 310, in accordance with the technology. Drive 305 and drive 310 are mirrored in a RAID 1 configuration. As illustrated, certain data written to drive 305 is also written to drive 310. In the illustrated application, data blocks $A_1$-$A_4$ are written to drive 305 at addresses 307a-307d. A drive controller module associated with drive 305 calculates parity block $P_1$, stored at address 307e, based on the data block parity group containing data blocks $A_1$-$A_4$. Data blocks $A_1$-$A_4$ are mirrored to drive 310 and stored at addresses 312a-312d. A drive controller module associated with drive 310 calculates parity block $P_1$, stored at address 312e, based on the data block parity group containing data blocks $A_1$-$A_4$. Data blocks $B_1$-$B_4$ are written to drive 305 at addresses 307f-307i. A drive controller module associated with drive 305 calculates parity block $P_2$, stored at address 307j, based on the data block parity group containing data blocks $B_1$-$B_4$. Data blocks $B_1$-$B_4$ are mirrored to drive 310 and stored at addresses 312f-312i. A drive controller module associated with drive 310 calculates parity block $P_2$, stored at address 312j, based on the data block parity group containing data blocks $B_1$-$B_4$.

In some instances, a mirrored pair of drives in a conventional RAID 1 configuration can recover from one of the two drives failing. Data can be read from the remaining operational drive. However, in some instances the remaining operational drive cannot recover from additional errors on that drive, such as sector failures. Beneficially, the technology can improve error recovery. For example, if drive 305 fails, drive 310 can still recover from sector failures. If a sector failure makes address 312a unreadable, data block $A_1$ can still be recovered using data blocks $A_2$-$A_4$ (stored at addresses 312b-312d) and parity block $P_1$ (stored at address 312e), as described above.

Figure 4:
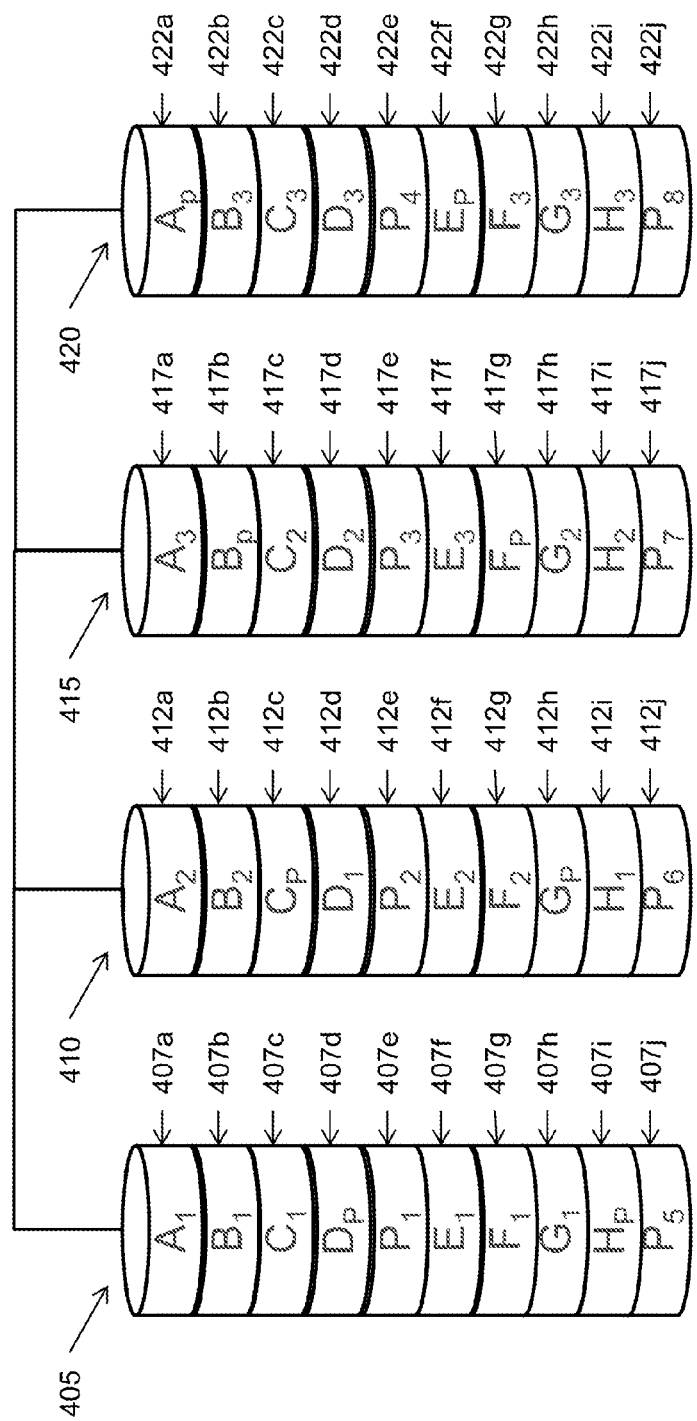
FIG. 4 depicts drives in accordance with the technology.

FIG. 4 depicts drive 405, drive 410, drive 415, and drive 420 in accordance with the technology. Drives 405, 410, 415, and 420 are in a RAID 5 configuration. As illustrated, data blocks $A_1$-$A_3$ are striped across drives 405, 410, and 415. Data block $A_1$ is stored at address 407a of drive 405. Data block A2 is stored at address 412a of drive 410. Data block $A_3$ is stored at address 417a of drive 415. Data block $A_P$ (e.g., a parity block calculated based on data blocks $A_1$-$A_3$) is stored at address 422a of drive 420. Data blocks $B_1$-$B_3$ are striped across drives 405, 410, and 420. Data block $B_1$ is stored at address 407b of drive 405. Data block $B_2$ is stored at address 412b of drive 410. Data block $B_3$ is stored at address 422b of drive 420. Data block $B_P$ (e.g., a parity block calculated based on data blocks $B_1$-$B_3$) is stored at address 417b of drive 415. Data blocks $C_1$-$C_3$ and data block $C_P$, data blocks $D_1$-$D_3$ and data block $D_P$, data blocks $E_1$-$E_3$ and data block $E_P$, data blocks $F_1$-$F_3$ and data block $F_P$, data blocks $G_1$-$G_3$ and data block $G_P$, and data blocks $H_1$-$H_3$ and data block $H_P$ are similarly striped across drives 405, 410, 415, and 420 as illustrated.

In accordance with the technology, parity block $P_1$, stored at address 407e of drive 405, is calculated based on the data block parity group containing data blocks $A_1$, $B_1$, $C_1$, and $D_P$. Parity block $P_2$, stored at address 412e of drive 410, is calculated based on the data block parity group containing data blocks $A_2$, $B_2$, $C_P$, and $D_1$. Parity block $P_3$, stored at address 417e of drive 415, is calculated based on the data block parity group containing data blocks $A_3$, $B_P$, $C_2$, and $D_2$. Parity block $P_4$, stored at address 422e of drive 420, is calculated based on the data block parity group containing data blocks $A_P$, $B_3$, $C_3$, and $D_3$. Parity block $P_5$, stored at address 407j of drive 405, is calculated based on the data block parity group containing data blocks $E_1$, $F_1$, $G_1$, and $H_P$. Parity block $P_6$, stored at address 412j of drive 410, is calculated based on the data block parity group containing data blocks $E_2$, $F_2$, $G_P$, and $H_1$. Parity block $P_7$, stored at address 417j of drive 415, is calculated based on the data block parity group containing data blocks $E_3$, $F_P$, $G_2$, and $H_2$. Parity block $P_8$, stored at address 422j of drive 420, is calculated based on the data block parity group containing data blocks $E_P$, $F_3$, $G_3$, and $H_3$.

The technology can facilitate recovery of data in some instances where a conventional RAID 5 configuration could not recover the data. For example, if drive 405 fails and a sector failure causes data block $A_2$ to be unreadable, the technology can facilitate recovery of data block $A_1$ and data block $A_2$. As described above, data block $A_2$ can be recovered using data blocks $B_2$, $C_P$, $D_1$, and $P_2$. Data block $A_1$ can then be recovered using data blocks $A_2$, $A_3$, and $A_P$. More generally, the technology can facilitate data recovery of similar drive and sector failures.

Figure 5:
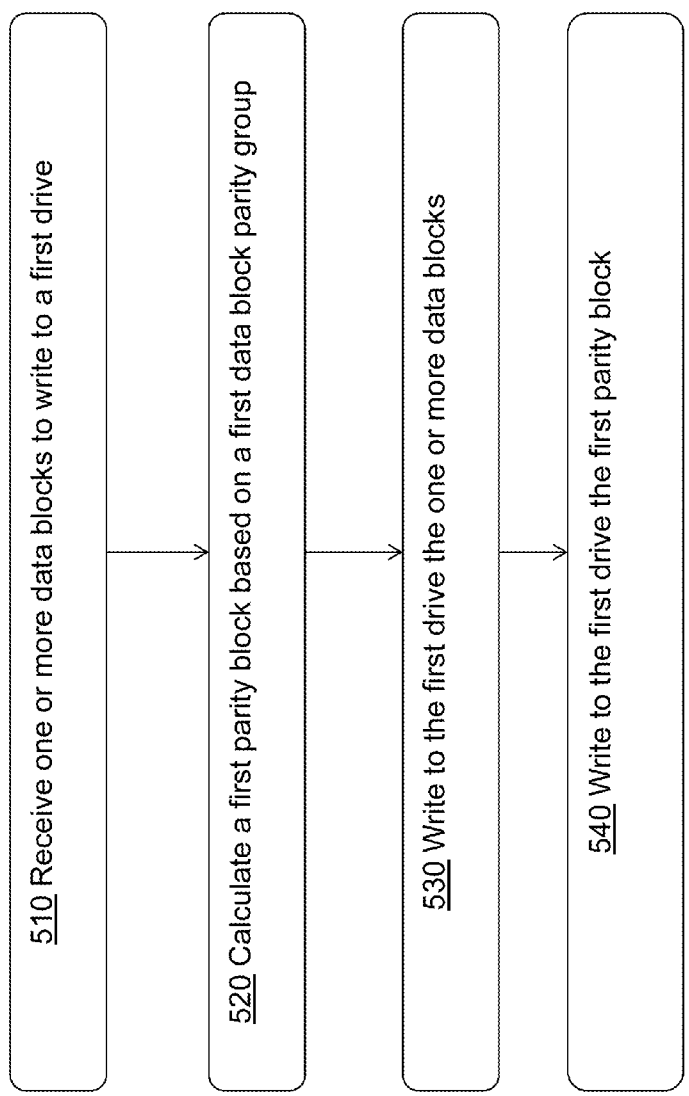
FIG. 5 depicts a flowchart illustrating a method of enhancing error recovery for a data storage drive.

FIG. 5 depicts a flowchart illustrating a method of enhancing error recovery for a data storage drive. At step 510, a first one or more data blocks are received to write to a first drive. For example, as described above with reference to FIG. 2A, data blocks $A_1$-$A_8$ can be received. At step 520, a first parity block is calculated based on a first data block parity group. The data block parity group can contain the one or more data blocks. For example, as described above with reference to FIG. 2A, parity block $P_1$ can be calculated based on data blocks $A_1$-$A_8$. At step 530, the one or more data blocks are written to the first drive. For example, as described above with reference to FIG. 2A, data blocks $A_1$-$A_8$ are written to addresses 210a-210h of drive 205. At step 540, the first parity block is written to the first drive. For example, as described above with reference to FIG. 2A, parity block $P_1$ is written to address 210i of drive 205. It should be appreciated that the steps of the described method can occur in other orders and/or in parallel. For example, steps 520 and 540 can be performed before, after, or in parallel with step 530.

Figure 6:
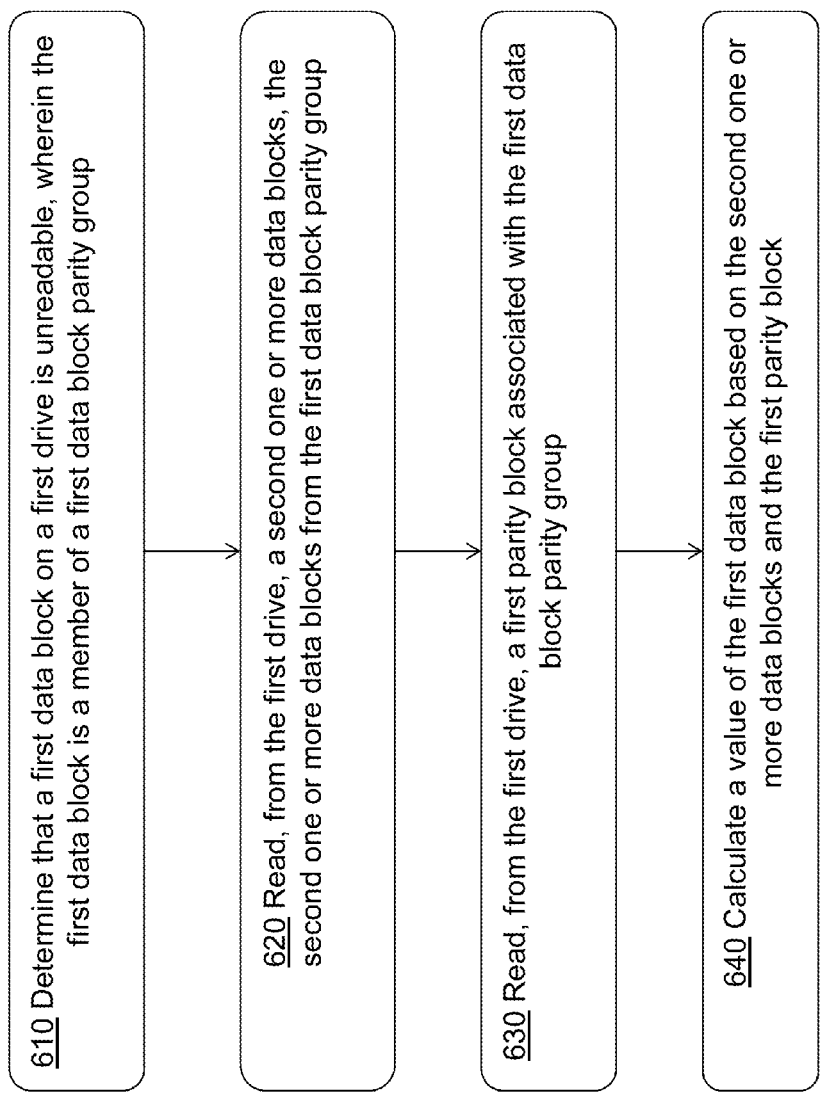
FIG. 6 depicts a flowchart illustrating a method of recovering a data block on a drive.

FIG. 6 depicts a flowchart illustrating a method of recovering a data block on a drive. At step 610, it is determined that a first data block on a first drive is unreadable, where the first data block is a member of a first data block parity group. For example, as discussed above, a first data block can be unreadable due to a sector failure on the first drive. At step 620, a second one or more data blocks are read from the first drive, where the second one or more data blocks are from the first data block parity group. For example, as described above, the remaining data blocks in the data block parity group associated with the unreadable data block can be read from the drive. At step 630, a first parity block associated with the first data block parity group is read from the drive. For example, as described above, the parity block associated with the unreadable block can be read from the drive. At 640, a value of the first data block is calculated based on the second one or more data blocks and the first parity block. For example, as described above, the unreadable data block can be recovered based on the associated parity block and the remaining data blocks from the data block parity group associated with the unreadable data block.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices or drives for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a storage system comprising a plurality of drive controller circuitries associated with a plurality of drives, respectively, the method comprising:
   receiving at least a plurality of first data blocks and a plurality of second data blocks;
   in a first writing step, writing the plurality of first data blocks to a first subset of the plurality of drives, respectively, leaving a first one of the plurality of drives unwritten to in the first writing step;
   in a second writing step, writing the plurality of second data blocks to a second subset of the plurality of drives, respectively, leaving a second one of the plurality of drives unwritten to in the second writing step, a first data block of the plurality of first data blocks being written to a third one of the plurality of drives in the first writing step, and a second data block of the plurality of second data blocks being written to the third one of the plurality of drives in the second writing step;
   calculating a first parity block based on the plurality of first data blocks written to the first subset of the plurality of drives;
   calculating a second parity block based on the plurality of second data blocks written to the second subset of the plurality of drives;
   writing the first parity block to the first one of the plurality of drives unwritten to in the first writing step;
   writing the second parity block to the second one of the plurality of drives unwritten to in the second writing step;
   calculating, by drive controller circuitry associated with at least the third one of the plurality of drives, at least a third parity block based at least on the first data block and the second data block written to the third one of the plurality of drives; and
   writing the third parity block to the third one of the plurality of drives.

2. The method of claim 1, wherein at least the first data block and the second data block written to the third one of the plurality of drives include a pre-determined number of data blocks.

3. The method of claim 1, further comprising:
   determining, by the drive controller circuitry associated with at least the third one of the plurality of drives, a number of data blocks in at least the first data block and the second data block written to the third one of the plurality of drives based on a number of data blocks in the plurality of first data blocks and the plurality of second data blocks; and
   writing, by the drive controller circuitry associated with at least the third one of the plurality of drives, the determined number of data blocks to the third one of the plurality of drives.

4. The method of claim 1, wherein the calculating of the third parity block by the drive controller circuitry associated with at least the third one of the plurality of drives includes performing an exclusive OR operation on at least the first data block and the second data block written to the third one of the plurality of drives.

5. A storage system comprising:
   a plurality of drives; and
   a plurality of drive controller circuitries associated with the plurality of drives, respectively,
   wherein one or more of the plurality of drive controller circuitries are configured:
      to receive at least a plurality of first data blocks and a plurality of second data blocks;
      in a first writing step, to write the plurality of first data blocks to a first subset of the plurality of drives, respectively, leaving a first one of the plurality of drives unwritten to in the first writing step;
      in a second writing step, to write the plurality of second data blocks to a second subset of the plurality of drives, respectively, leaving a second one of the plurality of drives unwritten to in the second writing step, a first data block of the plurality of first data blocks being written to a third one of the plurality of drives in the first writing step, and a second data block of the plurality of second data blocks being written to the third one of the plurality of drives in the second writing step;
      to calculate a first parity block based on the plurality of first data blocks written to the first subset of the plurality of drives;
      to calculate a second parity block based on the plurality of second data blocks written to the second subset of the plurality of drives;
      to write the first parity block to the first one of the plurality of drives unwritten to in the first writing step; and
      to write the second parity block to the second one of the plurality of drives unwritten to in the second writing step, and
   wherein drive controller circuitry associated with at least the third one of the plurality of drives is configured:
      to calculate at least a third parity block based at least on the first data block and the second data block written to the third one of the plurality of drives; and
      to write the third parity block to the third one of the plurality of drives.

6. The storage system of claim 5, wherein at least the first data block and the second data block written to the third one of the plurality of drives include a pre-determined number of data blocks.

7. The storage system of claim 5, wherein the drive controller circuitry associated with at least the third one of the plurality of drives is further configured:
   to determine a number of data blocks in at least the first data block and the second data block written to the third one of the plurality of drives based on a number of data blocks in the plurality of first data blocks and the plurality of second data blocks; and
   to write the determined number of data blocks to the third one of the plurality of drives.

8. The storage system of claim 5, wherein the drive controller circuitry associated with at least the third one of the plurality of drives is further configured:
   to calculate third parity block by performing an exclusive OR operation on at least the first data block and the second data block written to the third one of the plurality of drives.

9. A storage system comprising:
   a plurality of drives in a RAID configuration; and a plurality of drive controller circuitries associated with the plurality of drives, respectively, wherein one or more of the plurality of drive controller circuitries are configured:

to receive at least a plurality of first data blocks and a plurality of second data blocks;

in a first writing step, to write the plurality of first data blocks to a first subset of the plurality of drives, respectively, leaving a first one of the plurality of drives unwritten to in the first writing step;

in a second writing step, to write the plurality of second data blocks to a second subset of the plurality of drives, respectively, leaving a second one of the plurality of drives unwritten to in the second writing step, a first data block of the plurality of first data blocks being written to a third one of the plurality of drives in the first writing step, and a second data block of the plurality of second data blocks being written to the third one of the plurality of drives in the second writing step;

to calculate a first parity block based on the plurality of first data blocks written to the first subset of the plurality of drives;

to calculate a second parity block based on the plurality of second data blocks written to the second subset of the plurality of drives;

to write the first parity block to the first one of the plurality of drives unwritten to in the first writing step; and to write the second parity block to the second one of the plurality of drives unwritten to in the second writing step, and wherein drive controller circuitry associated with at least the third one of the plurality of drives is configured:

to calculate at least a third parity block based at least on the first data block and the second data block written to the third one of the plurality of drives; and to write the third parity block to the third one of the plurality of drives.

10. The storage system of claim 9, wherein the RAID configuration is selected from the group consisting of RAID 0, RAID 1, RAID 2, RAID 3, RAID 4, RAID 5, and RAID 6 configurations.

11. The storage system of claim 9, wherein the drive controller circuitry associated with at least the third one of the plurality of drives is further configured to:

calculate the first third parity block parity group by performing an exclusive OR operation on at least the first data block and the second data block written to the third one of the plurality of drives.

12. A method performed by a storage system comprising a plurality of drive controller circuitries associated with a plurality of drives, respectively, the method comprising:

determining that a data block stored on a respective drive is unreadable, wherein (1) in a first writing step, a plurality of first data blocks is written to a first subset of the plurality of drives, respectively, leaving a first one of the plurality of drives unwritten to in the first writing step, (2) in a second writing step, a plurality of second data blocks is written to a second subset of the plurality of drives, respectively, leaving a second one of the plurality of drives unwritten to in the second writing step, a first data block of the plurality of first data blocks being written to a third one of the plurality of drives in the first writing step, and a second data block of the plurality of second data blocks being written to the third one of the plurality of drives in the second writing step, (3) a first parity block is calculated based on the plurality of first data blocks written to the first subset of the plurality of drives, (4) a second parity block is calculated based on the plurality of second data blocks written to the second subset of the plurality of drives, (5) the first parity block is written to the first one of the plurality of drives unwritten to in the first writing step, (6) the second parity block is written to the second one of the plurality of drives unwritten to in the second writing step, (7) at least a third parity block is calculated by drive controller circuitry associated with at least the third one of the plurality of drives based at least on the first data block and the second data block written to the third one of the plurality of drives, and (8) the third parity block is written to the third one of the plurality of drives, and wherein the respective drive storing the unreadable data block corresponds to the third one of the plurality of drives;

reading, by the drive controller circuitry associated with at least the third one of the plurality of drives, at least the first data block and the second data block from the third one of the plurality of drives;

reading, by the drive controller circuitry associated with at least the third one of the plurality of drives, the third parity block from the third one of the plurality of drives; and calculating, by the drive controller circuitry associated with at least the third one of the plurality of drives, a value of the unreadable data block based on at least the first data block, the second data block, and the third parity block, each of the first data block, the second data block, and the third parity block being read from the third one of the plurality of drives.

* * * * *